United States Patent [19]

Wada et al.

[11] 3,821,808

[45] June 28, 1974

[54] TAPE CARTRIDGE ADAPTOR UNIT

[75] Inventors: Eiichi Wada, Yokohama; Yoshio Ono, Uokohama, both of Japan

[73] Assignee: Pioneer Electronic Corporation, Tokyo, Japan

[22] Filed: Dec. 21, 1971

[21] Appl. No.: 210,487

[30] Foreign Application Priority Data

Dec. 21, 1970 Japan..........................45-131982

[52] U.S. Cl.............................................360/94

[51] Int. Cl.............................................G11b 5/00

[58] Field of Search............ 274/4 R, 4 B, 4 C, 4 G, 274/11 R, 11 B, 11 C; 242/197–200

[56] References Cited

UNITED STATES PATENTS

| | | | |
|---|---|---|---|
| 3,662,123 | 5/1972 | Huber | 274/4 G |
| 3,507,501 | 4/1970 | Lear | 274/4 B |
| 3,612,541 | 10/1971 | Huber | 274/4 B |

*Primary Examiner*—Harry N. Haroian
*Attorney, Agent, or Firm*—Richard C. Sughrue et al.

[57] ABSTRACT

A magnetic tape cartridge adaptor for playing a small sized endless tape cartridge with a conventional tape recorder unit. The cartridge adaptor has therein a loading box into which the small sized cartridge may be inserted for playing. Locking means are provided for fixing the small sized cartridge in position within the loading box, and a switching means is used for permitting the tape recorder unit to play upon insertion of the small sized cartridge. The cartridge adaptor is also provided with a driving roller to drive the tape in the small sized cartridge which is driven by a capstan in the tape recorder unit through an idler, a recording and reproducing mgnetic head, and an electrical sensing post. When the small sized cartridge is inserted into the loading box, the locking means can engage with recessed portions formed on both sides of the cartridge, and the cartridge actuates the switching means to start the operation of the tape recorder unit, whereby the driving roller is driven to transport the tape in the small sized cartridge.

1 Claim, 2 Drawing Figures

TAPE CARTRIDGE ADAPTOR UNIT

BACKGROUND OF THE INVENTION

1. Field of the Invention

The present invention is directed to a tape cartridge adaptor, and more particularly to an endless tape cartridge adaptor to which a small sized endless tape cartridge is loaded, thereby permitting the small sized cartridge to be recorded and/or reproduced with the conventional cartridge tape recorder unit such as, for example, an eight track stereo player.

2. Description of the Prior Art:

A magnetic tape cartridge with the tape arranged in an endless array has been widely used as a car accessory or the like, as well as in domestic use because of its easiness of handling and simplicity of mechanical construction. On the other hand, a twin-hub type compact cassette which has also been commercially available has a remarkable feature of easiness in handling due to light weight and a compact structure which is far better than the endless cartridge. This noticeable feature of the compact cassette has stimulated manufacturing of several types of small sized endless cartridge having dimensions which correspond approximately to the size of the cassette.

However, marketing the small sized cartridge forces a modification of some of the conventional cartridge tape recorder units in order to play it. Consequently, this compels the user who wishes to utilize the small sized cartridge to buy another machine.

In order to eliminate the necessity of purchasing a special tape recorder, a cartridge adaptor has been proposed for permitting the small sized cartridge to be available with the conventional cartridge tape recorder unit. Such cartridge adaptor, however, has also been an inconvenience in that removal of the small sized cartridge often results in removal of the cartridge adaptor itself from the tape recorder unit. Furthermore, since the tape recorder unit may be brought into its operative condition only by insertion of the cartridge adaptor, whether the small sized cartridge is loaded thereto or not, the cartridge adaptor must be withdrawn whenever the small sized cartridge is unloaded from the recorder unit.

SUMMARY OF THE INVENTION

Therefore, the present invention provides a novel and improved cartridge adaptor construction and arrangement which can be permanently mounted even when the small sized cartridge is removed, while the insertion is as easy as the prior art cartridge adaptor.

Another feature of the present invention consists in the arrangement that the tape recorder unit is not caused to operate by insertion of the cartridge adaptor but only by insertion of the small sized cartridge.

Thus, the present invention provides a cartridge adaptor comprising a loading box having latching portions on the both sides thereof, into which the small sized cartridge may be inserted, locking means having a smaller retention force than that of the retention means of the tape recorder unit, and a switching means composed of a spring biased slidable plate, so that when the small sized cartridge is inserted into the loading box, the locking means engages into the latching portions and simultaneously the switching means actuates the tape recorder unit to operate.

BRIEF DESCRIPTION OF THE DRAWINGS

The present invention will become more apparent from the following description of the preferred embodiment taken in conjunction with the accompanying drawings in which FIG. 1 discloses a horizontal cross-sectional view of the cartridge adaptor of this invention

DESCRIPTION OF THE PREFERRED EMBODIMENT

Figure 1:
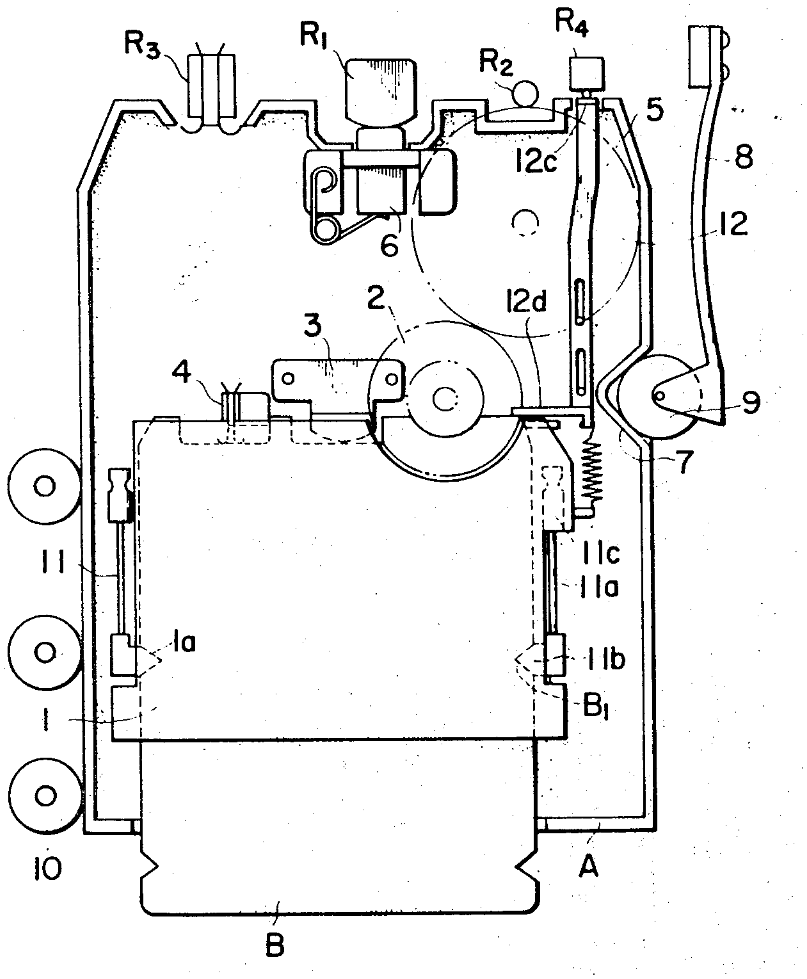

Referring now to the drawing, the cartridge adaptor A of the present invention is basically constructed in the same size and external shape as the conventional cartridge. This cartridge adaptor A is used to electrically and mechanically connect a small sized cartridge B, which will be fully described, with the recording and/or reproducing head R1, the capstan R2, and the electrical sensing post R5 provided respectively in the tape recorder unit (not shown). The small sized cartridge B is far smaller than the conventional cartridge having a size approximately that of the commercially available compact cassette, and is most suitable especially for a car-stereo unit or such things like that, due to its compactness and light weight.

In the inside of the cartridge adaptor A there is provided a loading box 1 into which the small sized cartridge B may be inserted, a driving roller 2 against which the tape in the cartridge B is pressed to be driven, a recording and/or reproducing head 3, and an electrical sensing post 4, each of which are positioned adjacent to the front portion of the loading box 1. The driving roller 2 itself does not have any driving power but is driven to rotate by the capstan R2 of the tape recorder unit through the rotation of an idler 5. Accordingly, the idler 5 is pivotally mounted with the peripheral portion exposed from the cartridge adaptor A so that when the adaptor A is inserted into the tape recorder unit, the exposed peripheral portion may contact with the capstan R2. Reference numeral 6 shows a relaying magnetic head which may be electromagnetically coupled to the head R1 of the recorder unit so as to direct the signal from the recording and/or reproducing head 3 to the head R1 through an amplifier circuit (not shown) and vice versa.

Fixation of the cartridge adaptor A is, as in the case of the conventional cartridge, accomplished by means of engagement of a retention member which is composed of a spring biased roller 9 and a leaf spring 8 with a V-shape notch formed in one side of the cartridge adaptor A. Guide rollers 10 are mounted on the opposite side, thereby permitting the idler 5 and the other members of the cartridge adaptor A to contact firmly with the capstan R2 and the corresponding members of the tape recorder unit. Thus, the cartridge adaptor A may be held in a firm stable relation against the tape recorder unit.

On the other hand, the loading of the small sized cartridge B to the adaptor A is accomplished by locking means 11 provided on both sides of the loading box 1 of the adaptor A. The locking means 11 is composed of a retention pawl 11*b* and a leaf spring 11*a* which has a suitable thickness for fixing the small sized cartridge B into the adaptor A in the optimum position. The rear end portion of the leaf spring 11*a* is fixed onto a base 11*c* which is secured to the adaptor A by means of caulking, screw and the like, while on the top end portion is attached a retention pawl 11*b* made of plastic material such as, for example, derlin, nylon or duracon, which will engage with a recessed portion B1 formed in the side of the small sized cartridge B. On both sides of the small sized cartridge B, V-shape recessed portions are formed, with which the retention pawl 11*b* may engage, while on both side portions of the loading box 1 corresponding to the recessed portions B1 of the cartridge B, openings are provided so that when the cartridge is inserted into the loading box 1, the retention pawl 11*b* may engage the recessed portion B1 through the opening so as to latch the cartridge B firmly in place. By suitably selecting the elasticity of the leaf spring 11*a*, the relation between the elasticity of the spring 11*a* and a leaf spring 8 for latching the cartridge adaptor A in position may be adjusted so that the cartridge adaptor A will not be jolted loose by insertion or withdrawal of the small sized cartridge.

Figure 2:
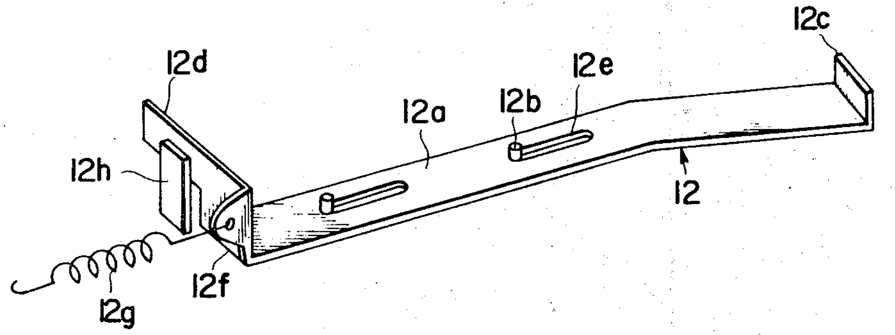
FIG. 2 illustrates a perspective view of the switching means used in the invention cartridge adaptor.

Referring now to FIG. 2 illustrating the switching means 12 which is used so that the tape recorder unit is not caused to operate by insertion of the small sized cartridge adaptor but only by insertion of the small sized cartridge. The switching means 12 is basically composed of a long and thin slidable plate 12*a* and stopper pin 12*b*. The slidable plate 12*a* is provided at both its ends with upturned lips, a pressing lip 12*c* and a receiving lip 12*d*, and further with two slots 12*e* in the middle portion thereof. The stopper pin 12*b* which is directly secure vertically on the cartridge adaptor A rides within the slot 12*e* so as to guide and limit the movement of the slidable plate 12*a*. The receiving lip 12*d* of the slidable plate has a small projected portion 12*f* to which is affixed an end of a coil spring 12*g* which will be described hereinafter. The slidable plate 12*a* is positioned so that the receiving lip 12*d* confronts the front end portion of the loading box 1 and the pressing lip 12*c* is positioned to contact with a micro-switch R4 which opens and closes the operation circuit of the tape recorder unit, and is usually biased in the direction of the locking means 11 by means of the coil spring 12*g*, one end of which is affixed to the projected portion 12*f* and the other end to a suitable portion of the loading box 1. An upstanding plate 12 secured to the cartridge adaptor A acts as a stopper to prevent excessive retreat of the slidable plate 12*a*.

The operation of the switching means described above is as follows: when only the cartridge adaptor is inserted into the tape recorder unit, the slidable plate is in a recessed position, so that the pressing lip 12*c* of the slidable plate does not press the micro-switch R4 so as to cause the tape recorder to operate. Upon insertion of the small sized cartridge B into the loading box 1, the front end portion of the artridge presses the receiving lip 12*d* to cause the slidable plate 12*a* to slide forward in opposition to the elastic force of the spring 12*g* with the result that the pressing lip 12*d* actuates the micro-switch R4, and thus the tape recorder unit starts to operate. When the small sized cartridge is removed, the slidable plate 12*a* is returned to the recessed position resulting in ceasing of operation of the tape recorder unit.

From the foregoing, it may be understood that since the retention spring for the small sized cartridge may be adjusted to be weaker than the retention spring for the cartridge adaptor, the cartridge adaptor may be held firmly and stably without looseness even in frequent repetition of insertion and withdrawal of the small sized cartridge. Accordingly, the contact of the small sized cartridge with the recording and/or reproducing head and other members is assured and adjustable without wow and flutter. Furthermore, since the operation of the tape recorder unit does not start to operate by insertion of the cartridge adaptor until insertion of the small sized cartridge. it is possible that the tape recorder unit can be left with the cartridge adaptor inserted.

While the above describes the preferred embodiment of the present invention, it is clear that various modifications can be made by those skilled in the art, and accordingly the scope of the present invention should be measured solely from the following claims in which:

What is claimed is:

1. In a tape cartridge adaptor for use on a tape recorder unit having retention means to hold a similar sized tape cartridge in an operative position, drive means for the tape and recording and reproducing means for the tape and wherein said retention means comprises a retention roller mounted at the free end of a cantilever leaf spring and spring biased into latching contact with said cartridge, the improvement comprising:

a frame member having a V-shaped notch defining latching means for cooperating with the retention means of the tape cartridge and adapter to receive a smaller sized tape cartridge than the tape recorder unit is designed to be operative with;

a retaining means in the frame member to hold the smaller sized tape cartridge in an operative position, said retaining means comprising secondary leaf springs fixed to said frame member on each side of said smaller sized tape cartridge and extending parallel to the sides of said smaller sized tape cartridge, opposed V-shaped recesses within respective sides of said smaller sized tape cartridge, and retention pawles carried at the free end of said secondary leaf spring and spring biased into said recesses, the biasing force of said primary leaf spring being in excess to the combined biasing force of both said secondary leaf springs, whereby the smaller sized tape cartridge can be removed from said tape cartridge adaptor without removing the tape cartridge adaptor;

means for transmitting the movement of the drive means of the tape recorder to the tape of the smaller sized tape cartridge;

means for electrically interconnecting the recording and reproducing means with the tape of the smaller sized tape cartridge; and switching means for controlling the operation of the tape recorder, said switching means comprising a spring biased plate responsive to insertion and removal of the smaller sized tape cartridge in the tape cartridge adaptor, said spring biased plate being U-shaped in cross section, having elongated spaced slots in longitudinal alignment, said adaptor including pins fixedly mounted within the same and received by said elongated slots to guide said plate along a path limited to the length of said elongated slots, and said U-shaped sliding plate including a first protruding lip member at one end engageable by the smaller sized tape cartridge and a second protruding lip member at the opposite end for contacting a microswitch fixedly mounted to said tape recorder unit in the path of said sliding plate.

* * * * *